(12) United States Patent
Yim et al.

(10) Patent No.: US 8,558,935 B2
(45) Date of Patent: Oct. 15, 2013

(54) SCENE INFORMATION DISPLAYING METHOD AND APPARATUS AND DIGITAL PHOTOGRAPHING APPARATUS USING THE SCENE INFORMATION DISPLAYING METHOD AND APPARATUS

(75) Inventors: Hyun-ock Yim, Suwon-si (KR); Ung-sik Kim, Suwon-si (KR); Jong-sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 12/619,789

(22) Filed: Nov. 17, 2009

(65) Prior Publication Data

US 2010/0123815 A1    May 20, 2010

(30) Foreign Application Priority Data

Nov. 18, 2008    (KR) ........................ 10-2008-0114850

(51) Int. Cl.
*H04N 5/222*    (2006.01)

(52) U.S. Cl.
USPC ................................ 348/333.02; 348/333.11

(58) Field of Classification Search
None
See application file for complete search history.

(56) References Cited

U.S. PATENT DOCUMENTS

| | | | |
|---|---|---|---|
| 5,537,528 A * | 7/1996 | Takahashi et al. ............. 715/255 |
| 7,271,838 B2 * | 9/2007 | Suekane et al. .......... 348/333.02 |
| 2003/0112361 A1 * | 6/2003 | Cooper .......................... 348/364 |
| 2003/0222867 A1 * | 12/2003 | Bean et al. ..................... 345/211 |
| 2005/0270397 A1 * | 12/2005 | Battles ...................... 348/333.01 |
| 2006/0192879 A1 * | 8/2006 | Hisamatsu ............... 348/333.01 |
| 2007/0065137 A1 * | 3/2007 | Hara et al. ..................... 396/291 |
| 2009/0073285 A1 * | 3/2009 | Terashima ............... 348/231.99 |
| 2009/0103888 A1 * | 4/2009 | Murabayashi et al. ......... 386/52 |
| 2009/0237548 A1 * | 9/2009 | Watanabe et al. ........ 348/333.02 |

* cited by examiner

*Primary Examiner* — Justin P Misleh
(74) *Attorney, Agent, or Firm* — Drinker Biddle & Reath LLP (57) ABSTRACT

In exemplary scene information displaying apparatus and methods, scene information is detected from an input image, a scene for the input image is determined by using the scene information, probabilities that the determined scene corresponds to respective scene modes are calculated, and a scene information identifier including the probabilities for the scene modes is generated and displayed. Thus, users may be informed of all applicable scene modes for a current image.

22 Claims, 8 Drawing Sheets

SCENE INFORMATION DISPLAYING METHOD AND APPARATUS AND DIGITAL PHOTOGRAPHING APPARATUS USING THE SCENE INFORMATION DISPLAYING METHOD AND APPARATUS

CROSS-REFERENCE TO RELATED PATENT APPLICATION

This application claims the priority benefit of Korean Patent Application No. 10-2008-0114850, filed on Nov. 18, 2008, in the Korean Intellectual Property Office, the disclosure of which is incorporated herein in its entirety by reference.

BACKGROUND

1. Field of the Invention

The present invention relates to image signal processing, and more particularly, to a scene information displaying method and apparatus in which information about a scene that a user desires to photograph is displayed in various forms to the user, and a digital photographing apparatus using the scene information displaying method and apparatus.

2. Related Art

In the conventional art, a scene to be photographed is identified, and then a mode corresponding to the identified scene is displayed on a liquid crystal display (LCD) screen. For example, if a digital camera photographs a sports scene, a mode corresponding to the sports scene is determined to be a sports mode, and the sports mode is displayed in the form of a character string "SPORTS" or an icon capable of representing sports so that users can see the photographed sports scene. A mode for scene identification is displayed in the form of the icon in a mode dial or on a display unit.

However, in the conventional art, after a scene to be photographed is identified, only a determined mode from among several modes is displayed as a character or an icon, and only a determined scene from among several scenes is displayed as an icon or a character. Thus, users cannot determine what scenes capable of being determined exist, or how many scenes can be distinguished, until the user looks at an instruction manual.

In addition, when a user sees a mode dial or a graphical user interface (GUI) displayed on a display unit in order to access a conventional scene determination mode, the user does not know the scene determination mode until the user checks a user manual, although checking of the GUI is a technique or a function developed for beginner users.

SUMMARY

In an exemplary scene information displaying method and apparatus, a number and types of scene modes used in a scene determination function such as scene recognition, and all scene modes to which a current input image may correspond, are displayed to a user so that the user can easily recognize a scene mode. An exemplary digital photographing apparatus may use scene information displaying method and apparatus.

In an embodiment, a scene information displaying method includes detecting scene information from an input image, determining a scene for the input image by using the scene information, calculating probabilities that the scene corresponds to respective scene modes, generating a scene information identifier including the probabilities for the scene modes, and displaying the scene information identifier on a display unit.

The scene information identifier may include information of at least two scene modes.

The at least two scene modes may be determined according to the probabilities.

The at least two scene modes may include a portrait mode, a night-view portrait mode, a landscape mode, a night-view landscape mode, a macro photographing mode, a tripod photographing mode, a backlight mode, or a backlight portrait mode.

The scene information displaying method may further include setting a photographing condition for a scene mode selected by a user from among the at least two scene modes.

The displaying of the scene information identifier may include displaying, in a chart form, the scene information identifier including the at least two scene modes.

The displaying of the scene information identifier may include displaying, in a text form, the scene information identifier including the at least two scene modes.

The displaying of the scene information identifier may include displaying the scene information identifier including information of the at least two scene modes together with the input image on the display unit.

The displaying of the scene information identifier may include displaying the scene information identifier including information of the at least two scene modes separately from the input image on the display unit.

The input image may include a preview image, a captured image, or a recorded image.

In another embodiment, a scene information displaying apparatus includes a scene information detection unit configured to detect scene information from an input image, a scene determination unit communicatively coupled with the scene information detection unit, the scene determination unit configured to determine a scene for the input image by using the scene information detected by the scene information detection unit, a scene information identifier generation unit communicatively coupled with the scene determination unit, the scene information identifier generation unit configured to calculate probabilities that the scene determined by the scene determination unit corresponds to respective scene modes, and generate a scene information identifier including the probabilities for the scene modes, and a control unit communicatively coupled with the scene information identifier generation unit, the control unit configured to control the scene information identifier generated by the scene information identifier generation unit to be displayed.

The scene information identifier generation unit may be further configured to generate the scene information identifier to include information of at least two scene modes.

The scene information identifier generation unit may be further configured to determine the at least two scene modes according to the probabilities.

The control unit may be further configured to control the scene information identifier including information of the at least two scene modes to be displayed in a chart form or a text form.

The scene information detection unit may be further configured to detect scene information from the input image which may include a preview image, a captured image, or a recorded image.

The at least two scene modes may include a portrait mode, a night-view portrait mode, a landscape mode, a night-view landscape mode, a macro photographing mode, a tripod photographing mode, a backlight mode, and a backlight portrait mode.

The control unit may be further configured to control setting of a photographing condition for a scene mode selected by a user from among the at least two scene modes.

The control unit may be further configured to control the scene information identifier including information of the at least two scene modes to be displayed together with the input image on a display unit, or control the scene information identifier including information of the at least two scene modes to be displayed separately from the input image on the display unit.

In a further embodiment, a digital photographing apparatus may include an imaging device configured to generate an image signal from an input optical signal corresponding to a subject, and a scene information displaying apparatus communicatively coupled with the imaging device. The scene information displaying apparatus may include a scene information detection unit configured to detect scene information from an input image corresponding to the image signal generated by the imaging device, a scene determination unit communicatively coupled with the scene information detection unit, the scene determination unit configured to determine a scene for the input image by using the scene information detected by the scene information detection unit, a scene information identifier generation unit communicatively coupled with the scene determination unit, the scene information identifier generation unit configured to calculate probabilities that the scene determined by the scene determination unit corresponds to respective scene modes, and generate a scene information identifier including the probabilities for the scene modes, and a control unit communicatively coupled with the scene information identifier generation unit, the control unit configured to control the scene information identifier generated by the scene information identifier generation unit to be displayed.

In yet another embodiment, a computer-readable storage medium may have stored thereon a program executable by a processor for performing a scene information displaying method as described above.

BRIEF DESCRIPTION OF THE DRAWINGS

The above and other features and advantages of the present invention will become more apparent by describing in detail exemplary embodiments thereof with reference to the attached drawings listed below.

DETAILED DESCRIPTION

Embodiments will now be explained with reference to the accompanying drawings. It should be understood however that the disclosed embodiments are merely exemplary. The following description and accompanying drawings are not to be construed as limiting the invention, which may be embodied in various forms. Numerous specific details are described to provide a thorough understanding of the present invention, as the basis for the claims and as a basis for teaching one of ordinary skill in the art how to make and/or use the invention. However, in certain instances, well-known or conventional details are not described in order not to unnecessarily obscure the present invention in detail.

Figure 1:
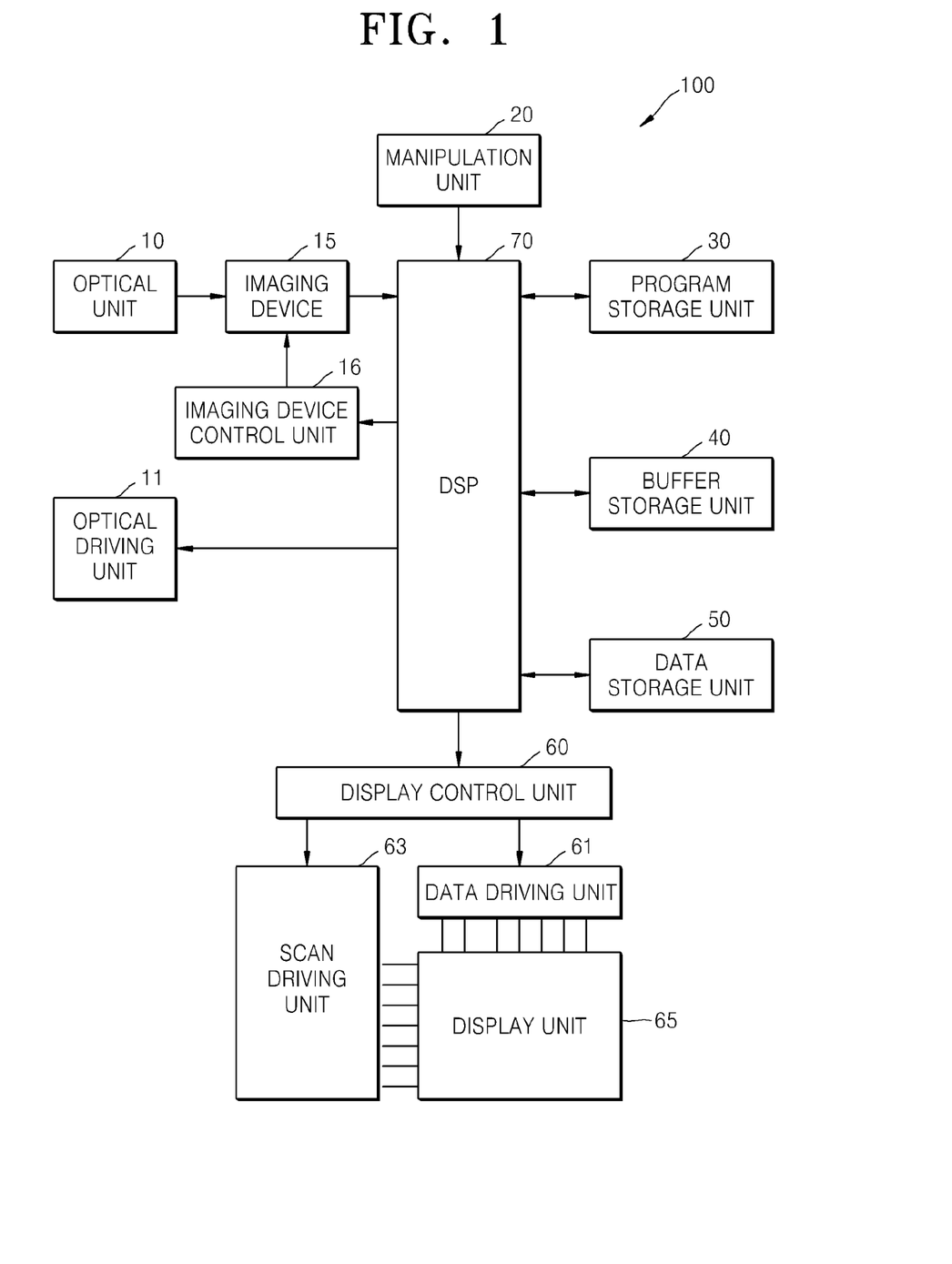
FIG. 1 is a schematic block diagram of an exemplary digital photographing apparatus.
Figure 2:
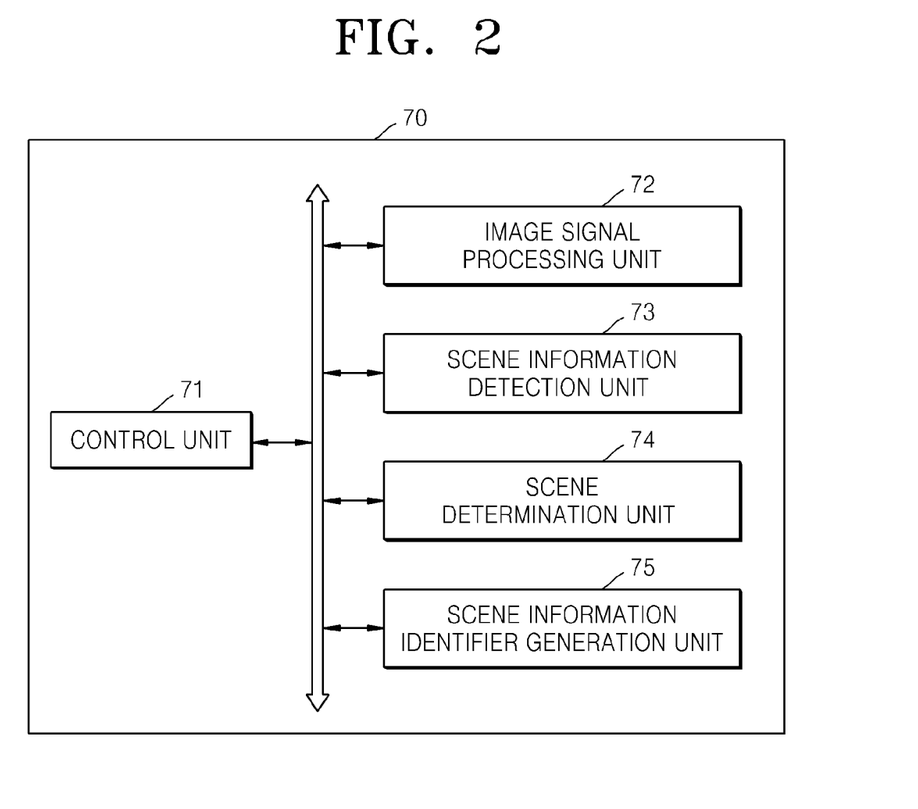
FIG. 2 is a block diagram of a structure of an exemplary digital signal processing unit included in the digital photographing apparatus illustrated in FIG. 1.

FIG. 1 is a schematic block diagram of an exemplary digital photographing apparatus. The digital photographing apparatus may include a digital camera 100. FIG. 2 is a block diagram of a structure of an exemplary digital signal processing unit 70 included in the digital camera 100 illustrated in FIG. 1.

As illustrated in FIG. 1, the digital camera 100 includes an optical unit 10, an optical driving unit 11, an imaging device 15, an imaging device control unit 16, a manipulation unit 20, a program storage unit 30, a buffer storage unit 40, a data storage unit 50, a display control unit 60, a data driving unit 61, a scan driving unit 63, a display unit 65, and the digital signal processing unit (DSP) 70.

The optical unit 10 may generate an optical signal corresponding to a subject to be photographed and may provide the optical signal to the imaging device 15. The optical unit 10 may include at least one lens from among a zoom lens which controls widening or narrowing an angle of view according to a focal length, a focus lens which focuses on the subject, and other lenses. The optical unit 10 may further include an aperture which adjusts an amount of light in the optical signal.

The optical driving unit 11 may control positions of the lenses of the optical unit 10, opening or closing of the aperture, and other features. The optical driving unit 11 may control opening or closing of the aperture in order to adjust the amount of light in the optical signal. The optical driving unit 11 may control the optical unit 10 according to a control signal which is automatically generated corresponding to an image signal input in real time, or according to a control signal which is manually input by a user.

The optical signal which has passed through the optical unit 10 may form an image of the subject on a light-receiving surface of the imaging device 15. The imaging device 15 may include a charge coupled device (CCD), a complementary metal oxide semiconductor (CMOS) image sensor (CIS), or the like, which transforms an optical signal into an electrical signal. Sensitivity and the like of the imaging device 15 may be controlled by the imaging device control unit 16. The imaging device control unit 16 may control the imaging device 15 according to the control signal which is automatically generated corresponding to the image signal input in real time or according to the control signal which is manually input by the user.

The manipulation unit 20 may input a control signal which originates from an external source, for example, from a user. The manipulation unit 20 may include a shutter-release button which inputs a shutter-release signal for photographing a picture by exposing the imaging device 15 to light (e.g., from the optical signal) for a predetermined period of time, a power button which inputs a power on/off signal in order to supply power, a wide angle zoom button and a telephoto zoom button which widen or narrow an angle of view according to an input, and various function buttons. Examples of the function buttons include buttons having a mode selection function, such as selection of a character input or photographing mode, a playback mode, or the like, a white balance setting function, an exposure setting function, and the like. Although the manipulation unit 20 may have various buttons as described above, the present invention is not limited thereto. The manipulation unit 20 may be implemented as any device through which users can input data, such as, a keyboard, a touch pad, a touch screen, a remote controller, or the like.

The program storage unit 30 may store programs including instructions executable by a processor. Examples of the programs may include an operating system, an application system, etc., which drive the digital camera 100. The buffer storage unit 40 may temporarily store data which is necessary during execution of an arithmetic operation, or resultant data obtained after the arithmetic operation. The data storage unit 50 may store various pieces of information necessary for the programs, including image files.

The display control unit 60 may control the display of an operational state of the digital camera 100 or image data obtained by a photographic operation performed by the digital camera 100. The data driving unit 61 and the scan driving unit 63 may receive data to be displayed from the display control unit 60 and transmit the display data to the display unit 65. The display unit 65 may display a predetermined image according to signals received from the data driving unit 61 and the scan driving unit 63. The display unit 65 may be implemented as a liquid crystal display (LCD) panel, an organic light-emission display (OLED) panel, an electrophoretic display (EPD) panel, or the like.

Under the control of the DSP 70, the display unit 65 may indicate, in the form of a scene information identifier, to which scene an input image, for example, a preview image, a captured image, or a recorded image, corresponds. The scene information identifier may include probabilities that the input image belongs to all respective scene modes capable of being determined from scene information detected from the input image. The types of determinable scene modes may be displayed as text or icons, and the probabilities (%) that the input image belongs to respective scene modes may be displayed in the form of a pie chart or a table.

The DSP 70 may process an image signal corresponding to the image formed on the imaging device 15, and control the other components of the digital camera 100 according to the received image signal or an external input signal.

The DSP 70 will now be described in greater detail with reference to FIG. 2. The DSP 70 may include a control unit 71, an image signal processing unit 72, a scene information detection unit 73, a scene determination unit 74, and a scene information identifier generation unit 75. Herein, the DSP 70 should be considered as including an embodiment of a scene information displaying apparatus as mentioned in the claims.

The control unit 71 may control the entire operation of the DSP 70.

The image signal processing unit 72 may transform the image signal received from the imaging device 15 into a digital signal, and perform image signal processing, such as gamma correction, color filter array interpolation, color matrix, color correction, color enhancement, and the like, in order to change the image signal so that the image signal conforms to human vision. When a function of the image signal processing unit 72 is set, the image signal processing unit 72 may perform an Auto White Balance or Auto Exposure algorithm. The image signal processing unit 72 may adjust the size of image data, that is, the digital signal, compress the size-adjusted image data, and form an image file having a predetermined format. The image signal processing unit 72 may also decompress the compressed image data. The image signal processing unit 72 may perform the above-described image signal processing with respect to an image signal received in real time in a live-view mode before a photographic operation is performed, and with respect to an image signal received according to the shutter-release signal. Different types of image signal processing may be performed on the two image signals.

The scene information detection unit 73 may detect scene information from the input image. The input image denotes an image captured by the digital camera 100, and may include a preview image captured before the photographic operation is performed, an image captured after the photographic operation is performed, or an image recorded on a recording medium. The scene information denotes information that represents the characteristics of a scene corresponding to the input image. For example, the scene information may include a face of a person who is the subject of the input image, a brightness of the input image, an illumination of a subject, or a distance between the digital camera 100 and the subject. The scene information detection unit 73 may detect the scene information by detecting the face of the person by using a face detection module or measuring the illumination of a subject. The scene information may also be detected using any of conventional scene detection or interpretation techniques.

The scene determination unit 74 may determine a scene corresponding to the input image by referring to the detected scene information. The scene determination unit 74 may determine the scene in order to determine whether the input image is, for example, a portrait image, a landscape image, a night-view portrait image, a night view landscape image, or a backlight image. In other words, when the face of a person is detected as scene information from the input image, the scene determination unit 74 may determine that the input image is a portrait image. When the illumination of a subject is detected as scene information from the input image, the scene determination unit 74 may determine whether the input image is a backlight image, according to the value of the illumination of the subject. When the brightness of the input image is detected as scene information from the input image, the scene determination unit 74 may determine whether the input image is a night-view image, according to the value of the brightness of the input image.

The scene information identifier generation unit 75 may calculate probabilities that the scene determined by the scene determination unit 74 corresponds to respective scene modes. The scene information identifier generation unit 75 may generate a scene information identifier using the calculated probabilities. The scene modes may include a portrait mode, a night-view portrait mode, a landscape mode, a night-view landscape mode, a macro photographing mode, a tripod photographing mode, a backlight mode, a backlight portrait mode, and the like. For example, if the scene determined by the scene determination unit 74 includes a portrait and a night view, the scene information identifier generation unit 75 may calculate a probability that the input image belongs to a portrait mode, a probability that the input image belongs to a night-view mode, and a probability that the input image belongs to a night-view portrait mode. Such probabilities may be calculated for all of the scene modes. Thus, high probabilities for a portrait mode, a night-view mode, and a night-view portrait mode may be calculated, and low probabilities for the other scene modes may be calculated.

The scene information identifier generation unit 75 may calculate the probabilities for all of the scene modes and generate the scene information identifier. The scene information identifier may include at least two scene modes and may be determined according to the probabilities for all of the scene modes. For example, a scene mode having a high probability may be included in the scene information identifier.

The scene information identifier may be generated in various forms such as a chart, text, a specific icon, and the like.

Figure 3A:
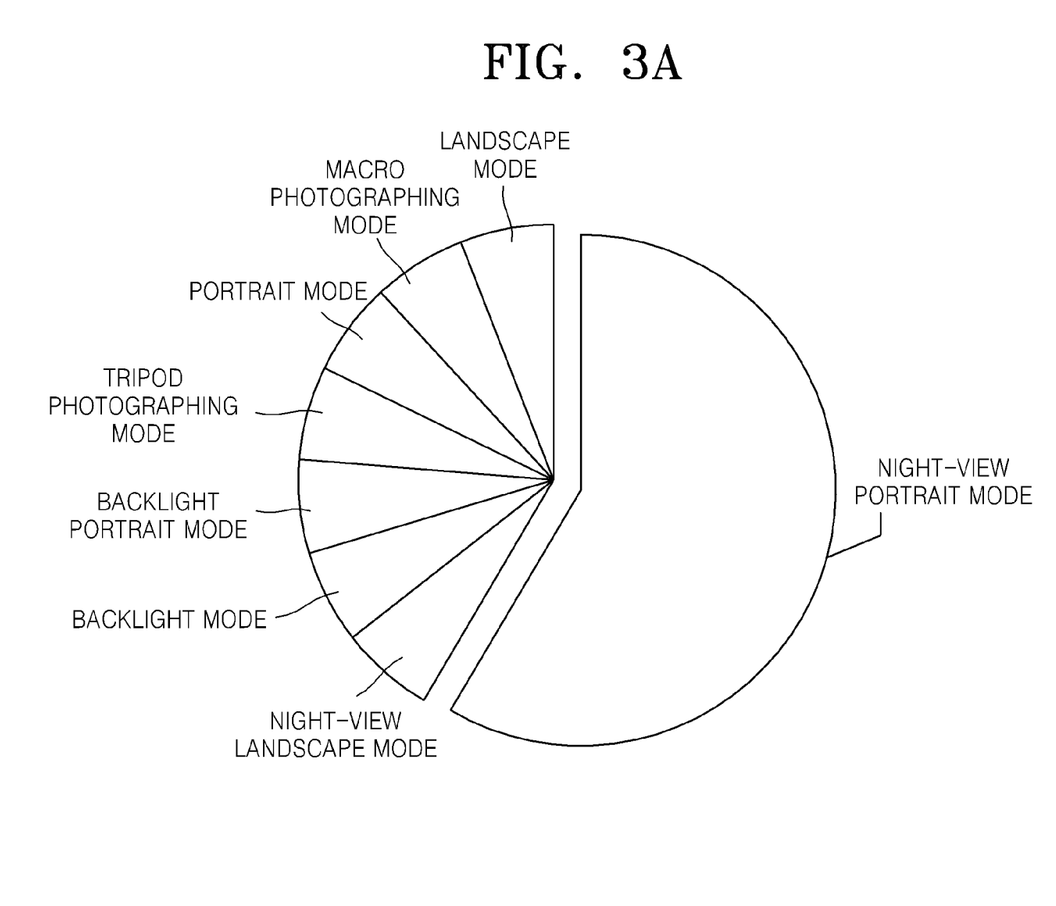
FIG. 3A illustrates an exemplary scene information identifier.
Figure 3B:
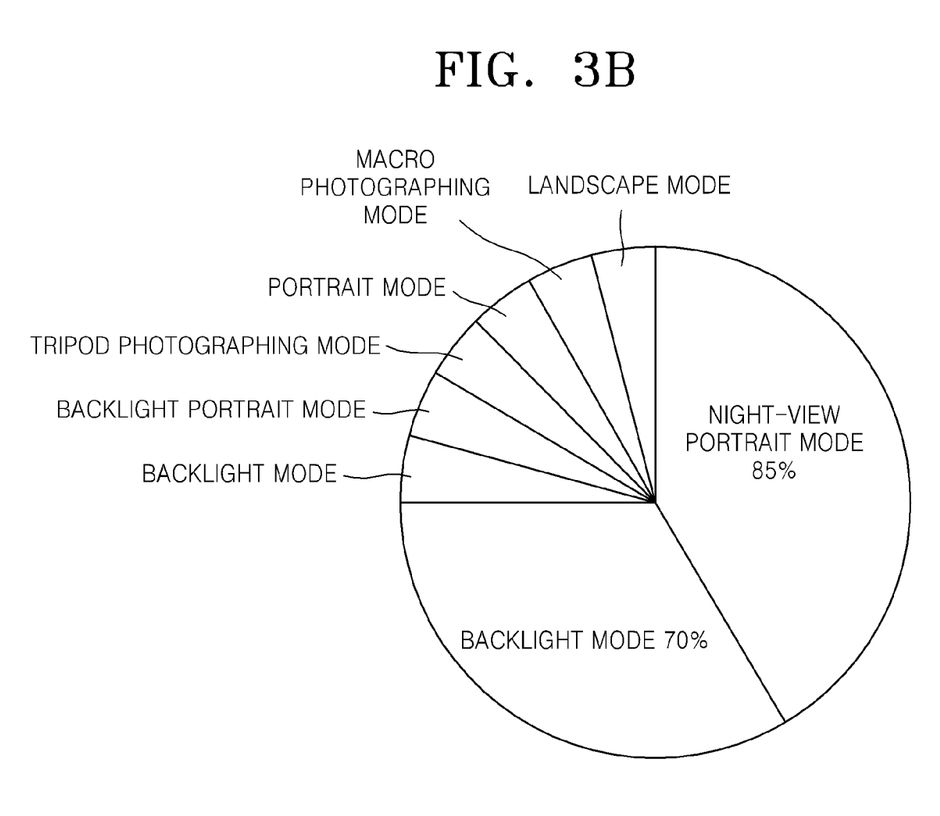
FIG. 3B illustrates another exemplary scene information identifier.
Figure 3C:
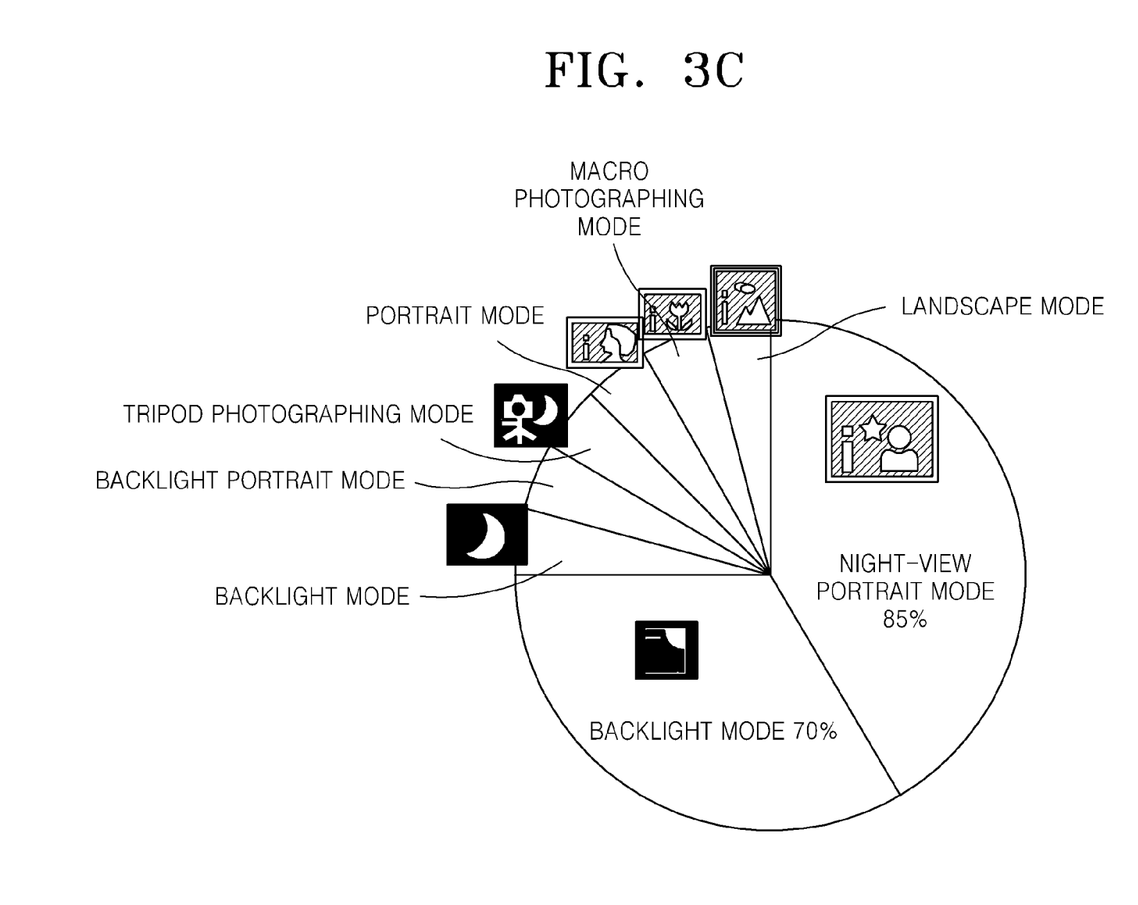
FIG. 3C illustrates another exemplary scene information identifier.

FIGS. 3A, 3B, and 3C illustrate various exemplary scene information identifiers.

FIG. 3A illustrates an exemplary scene information identifier which corresponds to scene modes represented in text and a pie chart. The illustrated scene information identifier of FIG. 3A indicates that the input image has the highest probability of corresponding to a night-view portrait mode. However, the scene information identifier also represents other scene modes with their respective corresponding probabilities.

FIG. 3B illustrates another exemplary scene information identifier in the form of a pie chart. The pie chart illustrated in FIG. 3B includes text and probabilities (%) that the input image corresponds to respective scene modes. Referring to FIG. 3B, a probability that the input image corresponds to a backlight portrait image is indicated to be 85%, and a probability that the input image corresponds to a backlight image is indicated to be 70%. Other scene modes with their respective corresponding probability values are also displayed.

FIG. 3C illustrates another exemplary scene information identifier in the form of a pie chart. The pie chart illustrated in FIG. 3C includes text, probabilities (%) that the input image corresponds to respective scene modes, and specific icons representing the respective scene modes. By referring to the icons and text of the scene information identifier of FIG. 3C, users may easily recognize that a probability that a current input image corresponds to a night-view portrait mode is 85% and that a probability that the current input image corresponds to a backlight mode is 70%.

Thus, exemplary embodiments of the scene information identifiers may address a problem of the conventional art in which users cannot view several types of scenes capable of being determined automatically or manually because only information about a determined scene is displayed. In a conventional method of displaying scene determination, only a single scene is displayed. However, actual scene determination may correspond to a probability calculation, and thus there may be a limit to determining several situations as a single case. For example, if a photographic operation is performed under a night-view condition or against a streetlight, when a probability of the night-view condition is determined to be 80%, the probability of a backlight condition may be determined to be 70% which is very similar to the probability of the night-view condition. In this case, the scene information identifiers according to the embodiments of the present invention may indicate that the probabilities of the two conditions, namely, the night-view condition and the backlight condition, are similar to each other.

When a scene information identifier is constructed with modes for determining scenes, icons for scene determination modes, for example, icons for respective scenes such as iA, iScene, etc., may be individually needed in the conventional art. However, the scene information identifiers according to the embodiments of the present invention may simply represent a representative display item for scene determination modes by using a single chart without individually generating icons or text for the respective scenes.

Although the scene information identifiers according to the embodiments of the present invention are displayed as pie charts in FIGS. 3A through 3C, the present invention is not limited thereto, and the scene information identifiers may be implemented in other various forms.

More specifically, in order to maximize a display effect of a scene information identifier, recognized modes may be displayed by using a colored flickering effect, or using a pattern such as a check pattern. Alternatively, the scene information identifier may be generated using an analog form, such as a compass, a clock, or the like, and displayed in the form of hands of the compass or clock instead of being simply displayed on a display window. Alternatively, the scene information identifier may be generated in a form where a hand of a clock moves between scene modes distinguished from one another according to time zones.

The control unit 71 may control the scene information identifier generated by the scene information identifier generation unit 75 to be displayed on the display unit 65. The control unit 71 may control the scene information identifier to be displayed together with the input image on the display unit 65 or to be displayed separately from the input image thereon. As described above, if the input image is a recorded image and the recorded image is played back, the control unit 71 may control previously-generated scene information identifiers to be displayed together with a currently generated scene information identifier.

In addition, the control unit 71 may control setting of photographing conditions corresponding to a scene mode selected by a user from among a plurality of scene modes. For example, if a user selects a night-view portrait mode from the scene information identifier illustrated in FIG. 3A, the control unit 71 may control setting of optimal photographing conditions for a case where a photographic operation is performed in the night-view portrait mode. For example, photographing conditions that may be set include automatic exposure (AE) processing through exposure setting, automatic focus (AF) processing for focus position detection, automatic white-balance (AWB) processing for automatically controlling a white balance, processing for determining a flash on or off, an aperture priority condition, a shutter priority condition, and the like.

Moreover, if no scene modes are selected by the user from the displayed scene information identifier for a certain period of time, the control unit 71 may control photographing conditions for a scene mode having the highest probability value to be automatically set. For example, referring to FIG. 3A, photographing conditions for a night-view portrait mode may automatically be set when the night-view portrait mode has the highest corresponding probability.

Figure 4:
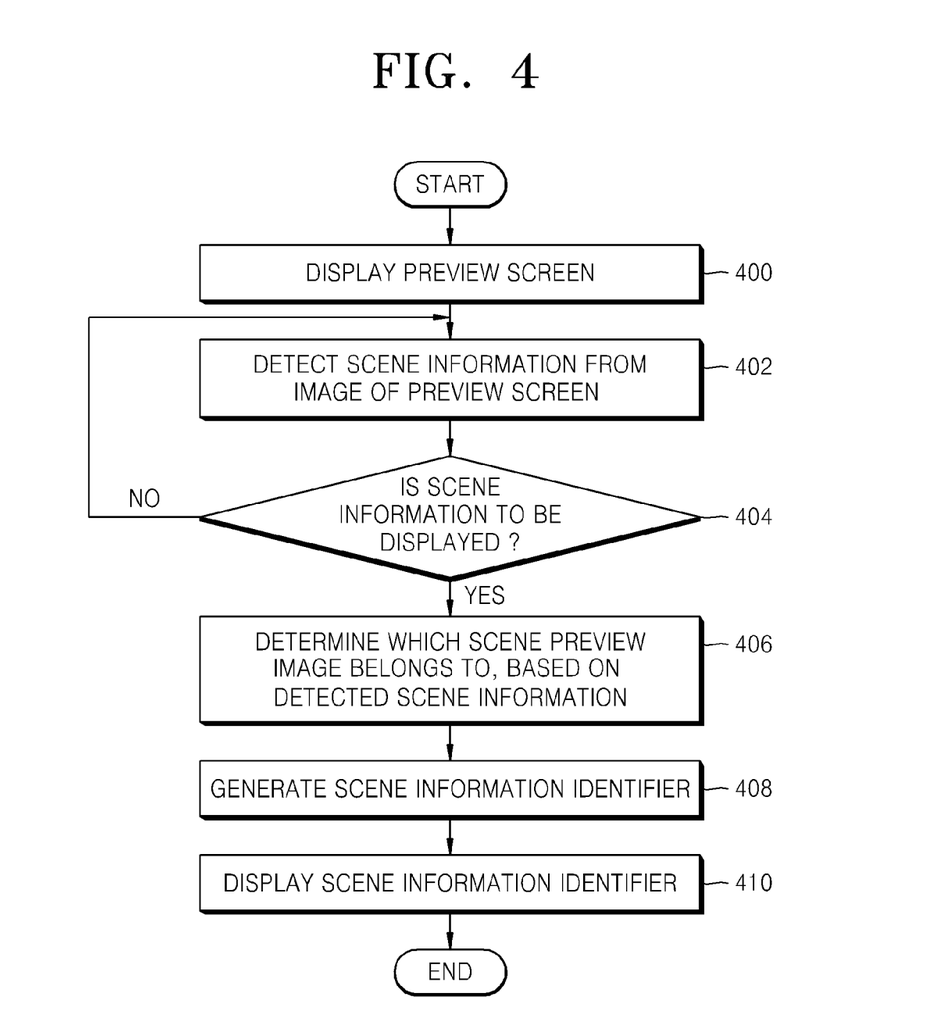
FIG. 4 is a flowchart of an exemplary scene information displaying method.

FIG. 4 is a flowchart of an exemplary scene information displaying method. Referring to FIG. 4, in operation 400, a preview screen may be displayed on a display window of a digital photographing apparatus. In operation 402, scene information may be detected from an image of the preview screen (hereinafter, referred to as a preview image). As described above, the scene information may include a face of a person who is the subject of the preview image, a brightness of the preview image, an illumination of a subject, a distance between the digital photographing apparatus and the subject, or the like.

In operation 404, a determination may be made regarding whether the scene information is to be displayed. If the determination is made that the scene information is to be displayed, the method proceeds to operation 406, in which a determination may be made regarding to which scene the preview image belongs, based on the scene information detected in operation 402.

In operation 408, probability values for a plurality of scene modes may be calculated and a scene information identifier may thereby be generated. In operation 410, the scene information identifier may be displayed.

Figure 5:
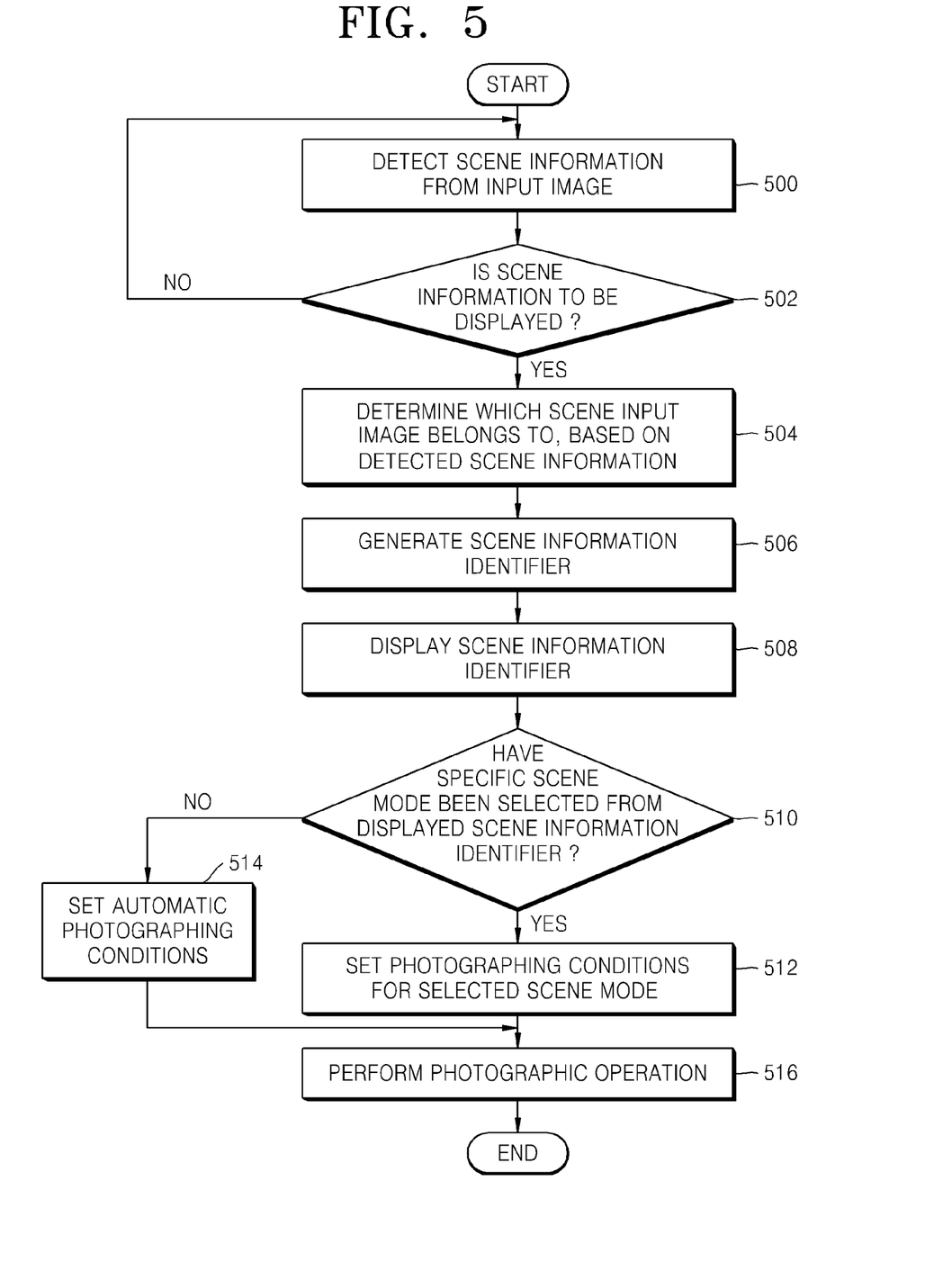
FIG. 5 is a flowchart of another exemplary scene information displaying method.

FIG. 5 is a flowchart of another exemplary scene information displaying method. Referring to FIG. 5, in operation 500, scene information may be detected from an input image. The input image may include a preview image or an image obtained after pressing a shutter button. In operation 502, a determination may be made regarding whether the scene information is to be displayed. If the determination is made that the scene information is to be displayed, the method proceeds to operation 504, in which a determination may be made regarding to which scene the input image belongs, based on the scene information detected in operation 500. The determination as to whether the scene information is to be displayed in operation 502 may be performed by a user.

In operation 506, probability values for a plurality of scene modes may be calculated and a scene information identifier may thereby be generated. In operation 508, the scene information identifier may be displayed.

In operation 510, a determination may be made regarding whether a specific scene mode has been selected by a user from the displayed scene information identifier. If the determination is made that the user has selected a specific scene mode, the method proceeds to operation 512. In operation 512, photographing conditions for the selected scene mode may be set. In operation 516, a photographic operation may be performed under the set photographing conditions.

On the other hand, if the determination is made in operation 510 that the user has not selected any scene modes for a certain period of time, the method proceeds to operation 514. In operation 514, automatic photographing conditions may be set. Thereafter in operation 516, a photographic operation is performed under the automatic photographing conditions set in operation 514. The automatic photographing conditions may be either previously set photographing conditions or photographing conditions for a scene mode having the highest probability value from among the scene modes included in the scene information identifier.

Figure 6:
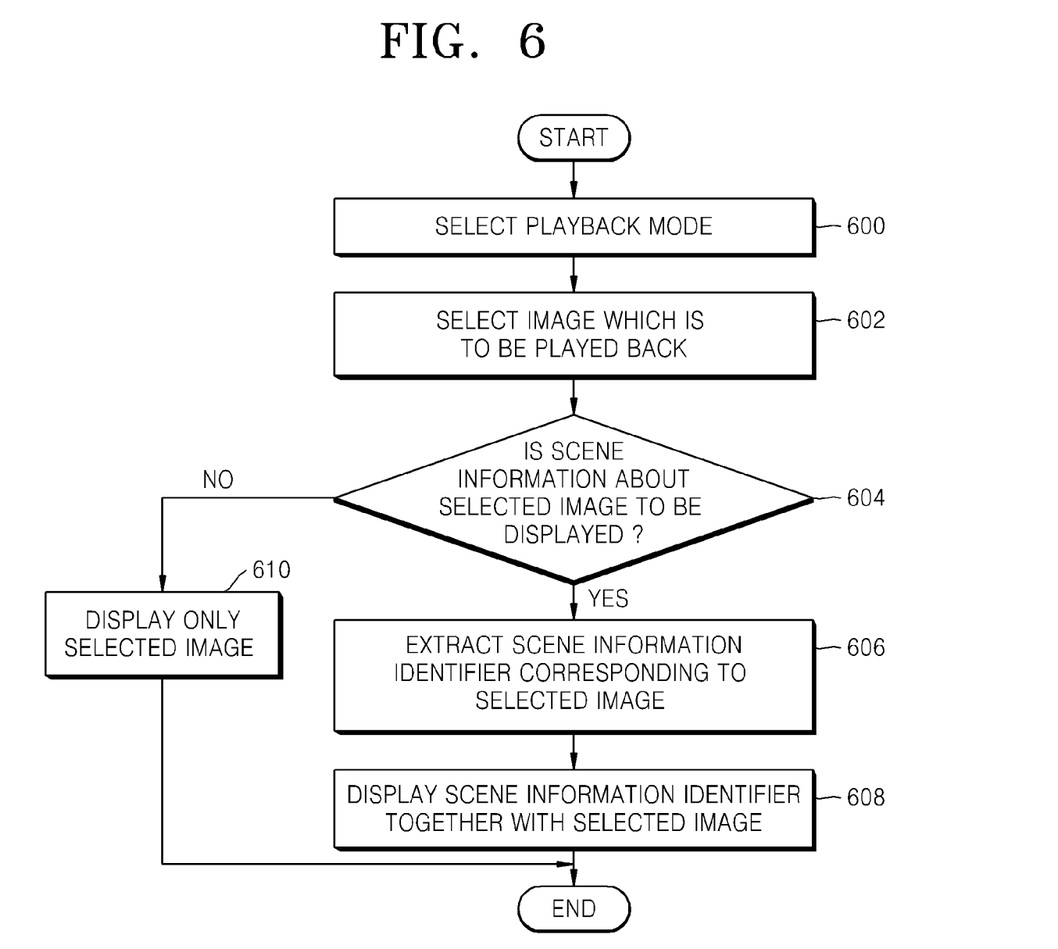
FIG. 6 is a flowchart of another exemplary scene information displaying method.

FIG. 6 is a flowchart of another exemplary scene information displaying method. Referring to FIG. 6, in operations 600 and 602 respectively, a user may select a playback mode and select an image which is to be played back. In operation 604, a determination may be made regarding whether scene information about the selected image is to be displayed. If the determination is made in operation 604 that the scene information is to displayed, a scene information identifier corresponding to the selected image may be extracted from Exchangeable Image File Format (EXIF) information, in operation 606. Then, in operation 608, the scene information identifier may be displayed together with the selected image.

On the other hand, if the determination is made in operation 604 that the scene information is not to be displayed, only the selected image may be displayed in operation 610.

In a scene information displaying method according to one or more embodiments of the present invention, scene information may be detected from an input image, a scene for the input image may be determined based on the scene information, probabilities that the determined scene belongs to respective scene modes may be calculated, and a scene information identifier including the probabilities of the scene modes may be generated and displayed. Thus, users may be able to determine all possible scene modes for a current image.

Although in the above-described embodiments a digital camera has been illustrated as an example of a photographing apparatus to which the present invention is applicable, the present invention is not limited thereto. It will be understood by one of ordinary skill in the art that the present invention may be applied to camera phones equipped with cameras, personal digital assistants (PDAs) equipped with cameras, and portable multimedia players (PMPs) equipped with cameras, for example.

Functional programs, codes, and code segments for accomplishing the present invention can be easily construed by programmers of ordinary skill in the art to which the present invention pertains. Embodiments of the present invention may be implemented as one or more software modules. These software modules may be stored as program instructions executable by a processor on a computer-readable storage medium, where the program instructions stored on this medium can be read by a computer, stored in a memory, and executed by the processor. Examples of the storage medium include magnetic storage media (e.g., floppy disks, hard disks, or magnetic tape), optical recording media (e.g., CD-ROMs or digital versatile disks (DVDs)), and electronic storage media (e.g., integrated circuits (IC's), ROM, RAM, EEPROM, or flash memory). The storage medium may also be distributed over network-coupled computer systems so that the program instructions are stored and executed in a distributed fashion.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The word mechanism is used broadly and is not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

It will be recognized that the terms "comprising," "including," and "having," as used herein, are specifically intended to be read as open-ended terms of art. The use of the terms "a" and "and" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

What is claimed is:

1. A scene information displaying method comprising:
    detecting scene information from an input image;
    determining a scene for the input image using the scene information;
    calculating a plurality of probabilities corresponding to a plurality of predefined scene modes, wherein each calculated probability is a probability that the scene corresponds to each respective scene mode in the plurality of predefined scene modes;
    generating a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode; and
    displaying the scene information identifier on a display unit.

2. The scene information displaying method of claim 1, wherein the scene information identifier comprises information of at least two scene modes.

3. The scene information displaying method of claim 2, wherein the at least two scene modes are determined according to the plurality of calculated probabilities.

4. The scene information displaying method of claim 2, wherein the at least two scene modes comprise at least one mode selected from the group consisting of a portrait mode, a night-view portrait mode, a landscape mode, a night-view landscape mode, a macro photographing mode, a tripod photographing mode, a backlight mode, and a backlight portrait mode.

5. The scene information displaying method of claim 2, further comprising setting a photographing condition for a scene mode selected by a user from among the at least two scene modes.

6. The scene information displaying method of claim 2, wherein the displaying of the scene information identifier comprises displaying, in a chart form, the scene information identifier including information of the at least two scene modes.

7. The scene information displaying method of claim 2, wherein the displaying of the scene information identifier comprises displaying, in a text form, the scene information identifier including the at least two scene modes.

8. The scene information displaying method of claim 2, wherein the displaying of the scene information identifier comprises displaying the scene information identifier including information of the at least two scene modes together with the input image on the display unit.

9. The scene information displaying method of claim 2, wherein the displaying of the scene information identifier comprises displaying the scene information identifier including information of the at least two scene modes separately from the input image on the display unit.

10. The scene information displaying method of claim 2, wherein the input image comprises at least one image selected from the group consisting of a preview image, a captured image, and a recorded image.

11. A non-transitory computer-readable storage medium having stored thereon a program executable by a processor for performing a scene information displaying method, the method comprising:
    detecting scene information from an input image;
    determining a scene for the input image by using the scene information;
    calculating a plurality of probabilities corresponding to a plurality of predefined scene modes, wherein each calculated probability is a probability that the scene corresponds to each respective scene mode in the plurality of predefined scene modes;
    generating a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode; and
    displaying the scene information identifier on a display unit.

12. A scene information displaying apparatus comprising:
    a scene information detection unit configured to detect scene information from an input image;
    a scene determination unit communicatively coupled with the scene information detection unit, the scene determination unit configured to determine a scene for the input image by using the scene information detected by the scene information detection unit;
    a scene information identifier generation unit communicatively coupled with the scene determination unit, the scene information identifier generation unit configured to calculate a plurality of probabilities corresponding to a plurality of predefined scene modes, wherein each calculated probability is a probability that the scene determined by the scene determination unit corresponds to each respective scene mode in the plurality of predefined scene modes, and generate a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode; and
    a control unit communicatively coupled with the scene information identifier generation unit, the control unit configured to control the scene information identifier generated by the scene information identifier generation unit to be displayed.

13. The scene information displaying apparatus of claim 12, wherein the scene information identifier generation unit is further configured to generate the scene information identifier to comprise information of at least two scene modes.

14. The scene information displaying apparatus of claim 13, wherein the scene information identifier generation unit is further configured to determine the at least two scene modes according to the plurality of calculated probabilities.

15. The scene information displaying apparatus of claim 13, wherein the control unit is further configured to control the scene information identifier comprising information of the at least two scene modes to be displayed in at least one form selected from the group consisting of a chart form and a text form.

16. The scene information displaying apparatus of claim 13, wherein the scene information detection unit is further configured to detect scene information from the input image comprising at least one image selected from the group consisting of a preview image, a captured image, and a recorded image.

17. The scene information displaying apparatus of claim 13, wherein the at least two scene modes comprise at least one mode selected from the group consisting of a portrait mode, a night-view portrait mode, a landscape mode, a night-view landscape mode, a macro photographing mode, a tripod photographing mode, a backlight mode, and a backlight portrait mode.

18. The scene information displaying apparatus of claim 13, wherein the control unit is further configured to control setting of a photographing condition for a scene mode selected by a user from among the at least two scene modes.

19. The scene information displaying apparatus of claim 13, wherein the control unit is further configured to control the scene information identifier comprising information of the at least two scene modes to be displayed together with the input image on a display unit or control the scene information identifier comprising information of the at least two scene modes to be displayed separately from the input image on the display unit.

20. A digital photographing apparatus comprising:
an imaging device configured to generate an image signal from an input optical signal corresponding to a subject; and
a scene information displaying apparatus communicatively coupled with the imaging device, the scene information displaying apparatus comprising:
a scene information detection unit configured to detect scene information from an input image corresponding to the image signal generated by the imaging device;
a scene determination unit communicatively coupled with the scene information detection unit, the scene determination unit configured to determine a scene for the input image by using the scene information detected by the scene information detection unit;
a scene information identifier generation unit communicatively coupled with the scene determination unit, the scene information identifier generation unit configured to calculate a plurality of probabilities corresponding to a plurality of predefined scene modes, wherein each calculated probability is a probability that the scene determined by the scene determination unit corresponds to each respective scene mode in the plurality of predefined scene modes, and generate a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode; and
a control unit communicatively coupled with the scene information identifier generation unit, the control unit configured to control the scene information identifier generated by the scene information identifier generation unit to be displayed.

21. A scene information displaying method comprising:
detecting scene information from an input image;
determining a scene for the input image using the scene information;
calculating a plurality of probabilities corresponding to a plurality of predefined scene modes, wherein each calculated probability is the probability that the scene corresponds to each respective scene mode in the plurality of predefined scene modes;
generating a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode, wherein
the scene information identifier comprises information of at least two scene modes, and
the at least two scene modes comprise at least one mode selected from the group consisting of a portrait mode, a night-view portrait mode, a landscape mode, a night-view landscape mode, a macro photographing mode, a tripod photographing mode, a backlight mode, and a backlight portrait mode; and
displaying the scene information identifier on a display unit in a chart form.

22. A digital photographing apparatus comprising:
a scene information detection unit configured to detect scene information from an input image;
a scene determination unit communicatively coupled with the scene information detection unit, the scene determination unit configured to determine a scene for the input image by using the scene information detected by the scene information detection unit;
a scene information identifier generation unit communicatively coupled with the scene determination unit, the scene information identifier generation unit configured to calculate a plurality of probabilities corresponding to a plurality of predefined scene modes, wherein each calculated probability is a probability that the scene determined by the scene determination unit corresponds to each respective scene mode in the plurality of predefined scene modes, and generate a scene information identifier depicting the plurality of calculated probabilities of the plurality of predefined scene modes with graphics that represent each calculated probability of each respective scene mode in the plurality of predefined scene modes, wherein the graphics that represent each calculated probability are created, after the calculating, to be proportional in size to the respective calculated probability of each predefined scene mode; and
a control unit communicatively coupled with the scene information identifier generation unit, the control unit configured to control the scene information identifier generated by the scene information identifier generation unit to be displayed.

* * * * *